April 20, 1954 — A. W. REDLIN — 2,675,822
BEER DISPENSER WITH MEANS FOR CONTROLLING THE HEAD OF FOAM
Filed March 31, 1949 — 2 Sheets-Sheet 1
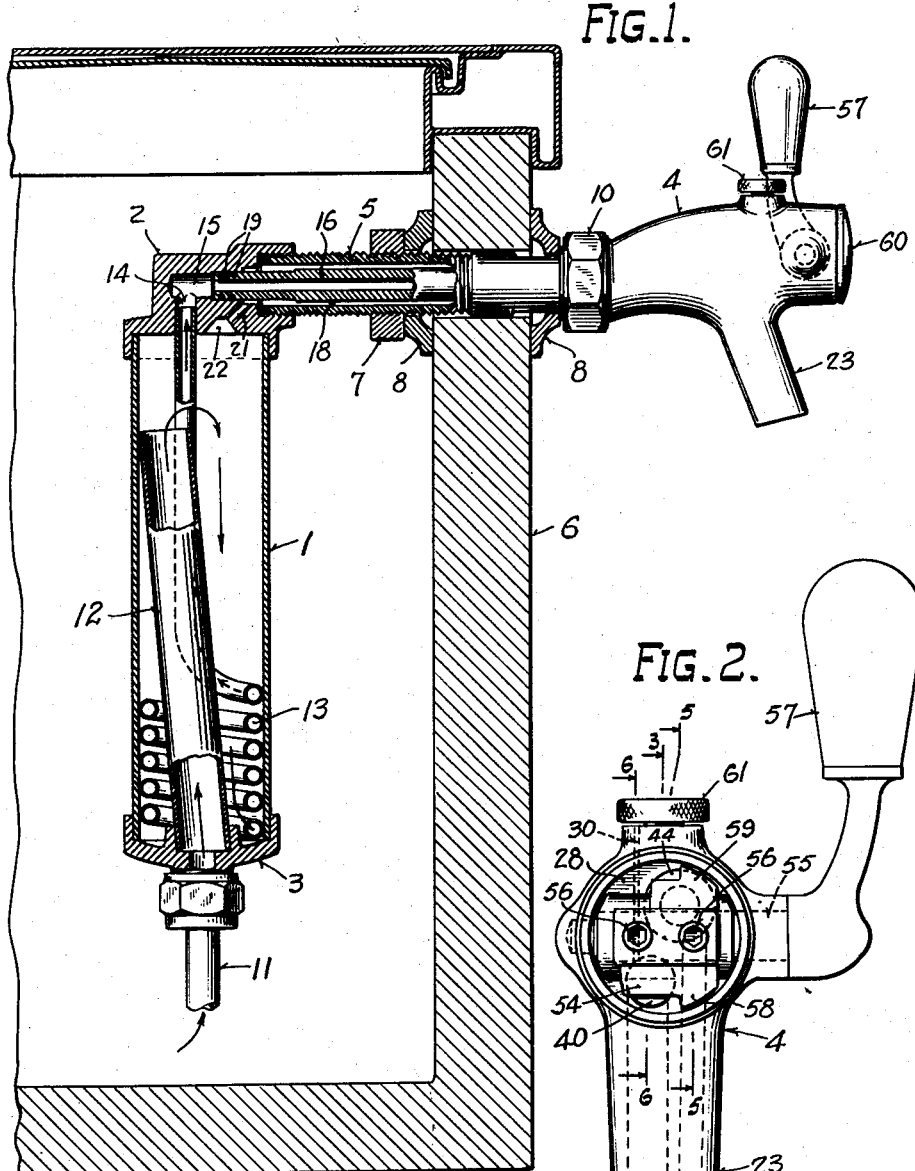
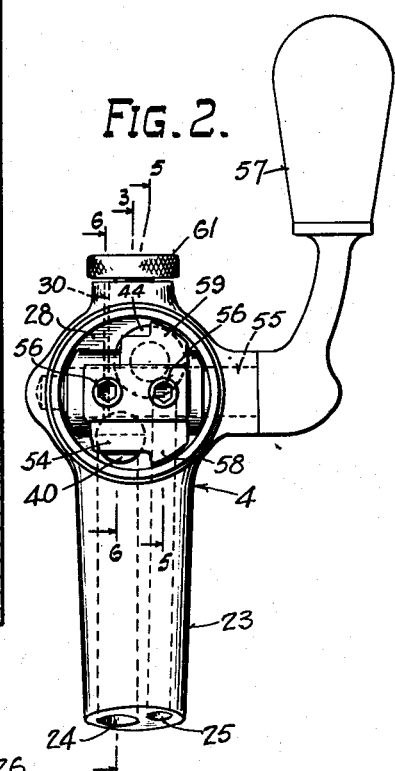
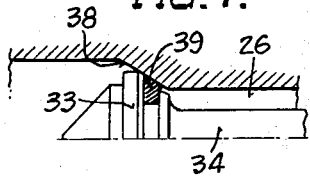
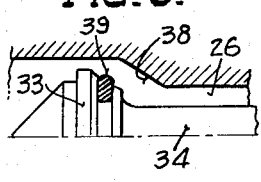
INVENTOR.
Alfred W. Redlin
BY Andrus & Scales
ATTORNEYS.

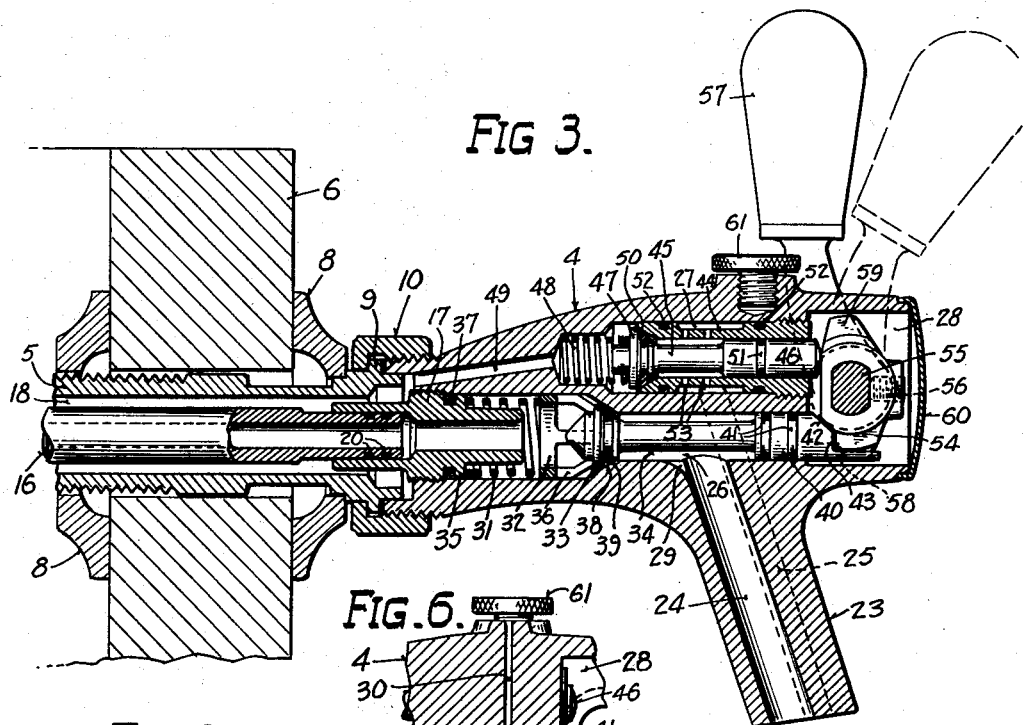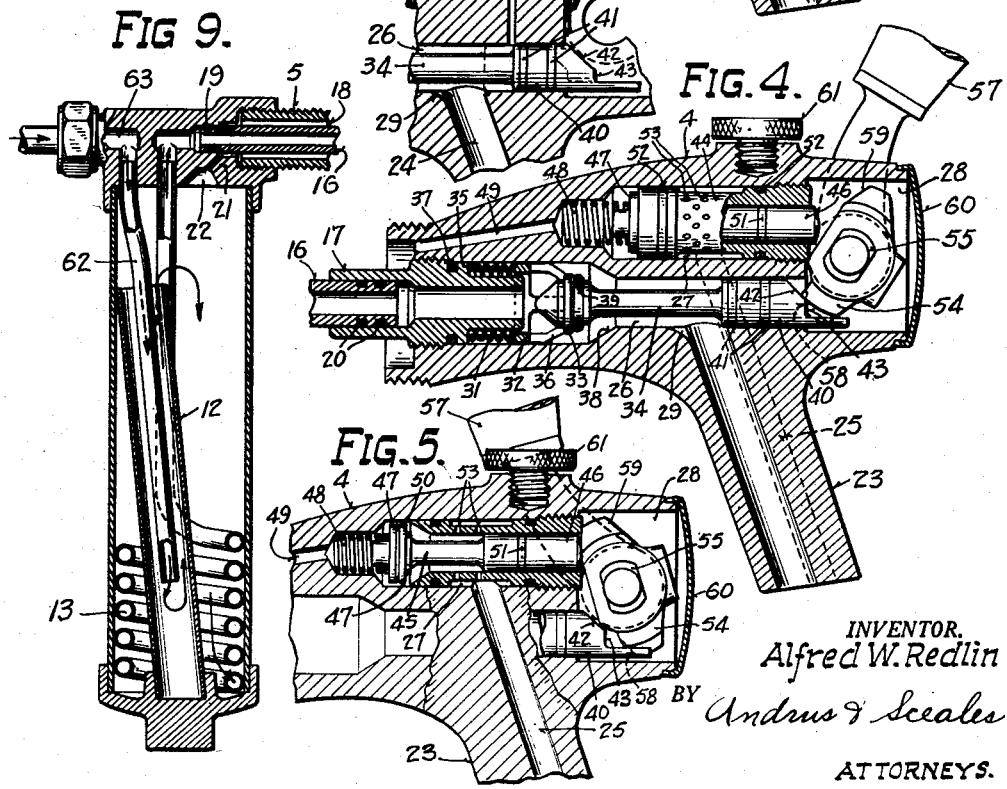

Patented Apr. 20, 1954

2,675,822

UNITED STATES PATENT OFFICE 2,675,822

BEER DISPENSER WITH MEANS FOR CONTROLLING THE HEAD OF FOAM

Alfred W. Redlin, Milwaukee, Wis.

Application March 31, 1949, Serial No. 84,585

7 Claims. (Cl. 137—170.3)

This invention relates to a beer dispensing system and is particularly directed to a system designed to dispense liquid beer with the full carbonization retained in solution therein, and foam in separate quantities desired.

An object of the invention is to provide a beer dispensing system in which wildness in the beer, upon being dispensed, is prevented.

Another object is to provide a beer dispensing system capable of dispensing liquid beer into a glass with the beer holding its carbonization, and adding a head of foam on the top of the drawn beer to seal off the beer and retain the carbonization and flavor brewed into the beer.

A further object is to provide a beer dispensing system in which the dispensing tank is maintained at all times full of liquid beer under pressure.

Another object is to provide a tap for a beer dispensing system which is easily assembled and disassembled for cleaning purposes.

Another object is to provide a tap in a beer dispensing system wherein the valve for dispensing solid beer may be set in open position and does not require manual holding.

A further object is to provide a beer dispensing system in which volume control of the beer is obtained with a smooth solid flow of beer into the container receiving the beer.

Another object is to provide a dispensing system for dispensing a carbonized beverage.

Another object of the invention is to provide a beer dispensing system in which the foamer acts as a bleeder for the control tank to relieve the system of any accumulations of gas or air.

Another object is to provide a beer dispensing system adapted to be employed with conventional types of beer cooling systems.

A further object is to provide a beer dispensing system wherein the unit is adapted to be used in various ways such as a tap box, tower dome, direct draw, direct tap rod and the like.

The beer dispensing system of the invention in general is directed to a control tank unit and tap constructed to deliver a smooth flow of liquid beer from the tap and to dispense liquid beer and foam separately in the quantities desired with the full carbonization and flavor brewed into the beer retained therein.

The accompanying drawings illustrate an embodiment of the invention.

In the drawings:

Figure 1 is a longitudinal sectional view showing an installation of the control tank of the invention with the tap connected thereto and shown in part in elevation;

Fig. 2 is a front elevational view of the tap with the cap removed;

Fig. 3 is a vertical section taken on line 3—3 of Fig. 2 showing the beer dispensing passage in the tap body with the beer dispensing valve and the foam dispensing valve closed;

Fig. 4 is a view similar to Fig. 3 with the beer dispensing valve open;

Fig. 5 is a vertical section taken on line 5—5 of Fig. 2 showing the foam dispensing passage in the tap body with the foam dispensing valve open;

Fig. 6 is a vertical section taken on line 6—6 of Fig. 2 showing the air vent passage;

Fig. 7 is an enclosed detail view of the beer dispensing valve in closed position;

Fig. 8 is a view similar to Fig. 7 showing the valve in its open position; and

Fig. 9 is a longitudinal sectional view illustrating another embodiment of the control tank.

The drawings show a beer dispensing system comprising, in general, a control tank formed of a cylindrical shell 1 closed at the top by a head 2 and at the bottom by head 3, and a tap 4 connected to the inside of head 2 by a tube 5 which extends between head 2 and the tap through a suitable opening in the box 6 enclosing the control tank.

Tube 5 is externally threaded in its extent inside box 6 for threading into head 2 and to permit threading of nut 7 thereon against the inside clamp washer 8 to confine the wall of box 6 between the inside washer 8 and the outer clamp washer 8.

The outer end of tube 5 carries flange 9 to retain nut 10 thereon. Nut 10 threads onto the inner end of the body of tap 4 against flange 9. The assembly described supports the tap on box 6 which is firmly secured to a support beneath a bar or the like, the nut 10 permitting mounting and removal of the tap without disturbing the entire system. Suitable sealing gaskets are disposed at each end of tube 5 to seal the tube against the tap on one side and the head 2 of the tank on the other side.

Inlet pipe 11 leading from a source for beer, not shown, is secured to either head 2 or 3, and beer flows through the pipe and a passage in the head into the tube 12 which is inset within head 3. In the embodiment of Fig. 1 the pipe 11 enters through the bottom head 3 to supply beer to tube 12.

Tube 12 extends upwardly into the tank for a substantial distance and is disposed on a slant to rest adjacent shell 1 near the upper end of the shell for quieting of the beer as it flows from the tube in a single path and against the liquid beer in the control tank and adjacent the shell wall.

Coils 13 of substantial length encircle tube 12 at the bottom of the control tank. The beer overflowing into the tank from tube 12 enters coils 13 at the bottom of the tank and is conveyed upwardly through the coils and a straight extension thereof to a passage 14 in upper head 2 which opens into horizontal chamber 15 into the outer end of which is threaded connecting tube 5 previously described. Coils 13 are in metal-to-metal contact with shell 1 of the control tank for cooling as the tank is surrounded by ice or other refrigerant.

The tube 16 extends internally of connecting tube 5 from chamber 15 inside of head 2 to within the sleeve 17 threaded into the inner end of tap 4. The tube 16 is spaced from the outer tube 5 to form annular passage 18 between the tubes, the use of which will be described hereinafter. O-rings 19 seal off chamber 15 in head 2 from passage 18 and O-rings 20 are disposed between tube 16 at the outer end and sleeve 17 to seal off the inside of sleeve 17 from passage 18. Beer flowing from the control tank passes from chamber 15 and thence through tube 16 into sleeve 17. Tube 16 floats within head 2 and sleeve 17 so that it is self-aligning with chamber 15 and the bore of sleeve 17.

Annular passage 18 is connected within head 2 by a diagonal passage 21 which extends to trap 22 formed on the bottom of head 2 at the top of shell 1. Beer and gases which tend to rise in the beer confined in the control tank flow off the top of the control tank through passage 21 into annular passage 18 and thence through the tap 4 as will be described.

Tap 4 comprises a body of one piece construction and generally cylindrical shape from which depends on an outward slant the discharge spout 23 of generally cylindrical shape. Spout 23 has a large bore 24 for discharge of liquid beer and a smaller bore 25 for discharge of foam, as will be described.

The body of the tap is machined on the inside to provide a suitably shaped horizontal bore or chamber 26 to receive the beer dispensing assembly and a second bore or chamber 27 above bore 26 to receive the foam dispensing assembly. In addition, the outer end of the body of the tap is machined to a cylindrical counterbore 28 to receive the mechanism for operating the beer and foam dispenser assemblies, as will be described. Counterbore 28 connects with both bores 26 and 27.

The bore 24 in spout 23 for discharge of beer intersects the horizontal bore 26 in the tap body, and bore 25 of the spout intersects foamer bore 27 in the tap body. A central groove 29 is provided at the rear approach to the intersection between bore 24 and bore 26 forming a trough which smoothens the flow of beer into the discharge spout from bore 26.

An air vent passage 30 extends through the tap body from a boss at the top thereof and opens into bore 26 to the front of the tap from the beer discharge bore 24 in spout 23. The purpose of air vent passage 30 is to eliminate beer after-drip in the closed position of the beer dispensing assembly, as will be described.

The beer dispensing assembly disposed in bore 26 comprises sleeve 17, previously described, which is threaded into the rear end of horizontal bore 26, and in general a spring 31, spacer 32 and the valve 33 provided at the inner end of the elongated valve stem 34 which extends outwardly to the forward end of bore 26.

Spring 31 is confined between bearing 35 on sleeve 17 and spacer 32 which is disposed to move over the forward end of the sleeve when valve 33 is opened. Four radially spaced prongs 36 project forwardly from spacer 32 and secure the same to the inner end of valve 33 which has a nose of conical shape. Spring 31 normally biases valve 33 to closed position.

The O-ring 37 encircles sleeve 17 to the rear of bearing 35 to seal off leakage of beer rearwardly from the tap.

The body portion of valve 33 back of the conical end thereof is tapered complementary to seat 38 formed in the tap body by a gradual forward decrease in diameter of bore 26 at the position of valve 33 therein. Bore 26 in its extent forwardly from valve 33 is of lesser diameter than the diameter of the rear portion of the bore within which sleeve 17 is located.

Valve 33 seats on seat 38 with a metal-to-metal contact therebetween to provide a predetermined positive position for valve 33 to index the mechanism for operating the valve and air vent passage 30.

The sealing ring 39 is confined in a circular groove on the outer portion of valve 33 and engages seat 38 as valve 33 seats thereagainst to provide a positive seal between the valve and its seat when valve 34 is closed. Sealing ring 39 is always uniformly compressed and is under pressure solely from valve 33. Sealing ring 39 is formed of rounded contour at the outer diameter and of a square contour at the inner diameter and the body of the ring between the outer diameter and center hole is provided with flat, parallel sides. The groove in valve 33 is machined with flat sides to receive the flat sides of the sealing ring and is of a depth that the sealing ring is compressed a predetermined amount when the valve is closed to seal off the valve opening in line contact with the tap body and permit the valve 33 to seat on the valve body in metal-to-metal contact. The construction of the ring and groove prevents sealing ring 39 from rolling out of the groove when valve 33 is opened and closed in operation, as shown in Figs. 7 and 8.

The outer diameter of the ring may also be formed with chamfered surfaces leading to a small radius.

The construction of sealing ring 39 holds wear to a minimum since a metal seat is provided for the valve and the sealing ring is always compressed only a predetermined amount to effect a seal of the valve opening. Once the valve is set to correct adjustment, no further adjustments are necessary.

Valve stem 34 extends forwardly through bore 26 across discharge passage 24 and is supported within the outer end of bore 26 by bearing 40. The stem 34 is of considerably lesser diameter than the bore 26 to permit beer flowing past valve 33 when open to flow freely into discharge passage 24.

O-rings 41 are located in axially spaced circular grooves in bearing 40 which is of slightly lesser diameter than bore 26. The outer O-ring 41 serves as a seal for the bearing and the inner O-ring 41 operates to open and close air vent 30 as the bearing 40 shifts back and forth in the opening and closing of the valve 33. When valve 33 is in open position and beer is being drawn from the tap, rear O-ring 41 seals off vent 30. In the closed position of valve 33 rear O-ring 41 opens vent 30 and air is admitted to permit any trapped beer to quickly flow out of discharge 24.

The outer end of stem 34 projects from bore 26 to within the lower portion of the counterbore 28 which receives the operating mechanism of the tap. The end of stem 34 is provided with the cam surface 42 which is located above the generally square cam seat 43. The use of the cam surface will be described hereinafter in connection with the operating mechanism of the tap.

The foamer assembly disposed in the longitudinal bore 27 in the tap body above bore 26 comprises in general a sleeve 44, which is threaded into the outer end of the bore, and a valve stem 45. Valve stem 45 at its outer end carries a bearing 46 which projects slightly from sleeve 44 into counterbore 28. Adjacent the other end of stem 45 a valve 47 is provided, the inner end of the stem 45 being encircled by a spring 48 which presses against valve 47 to normally close the same. A diagonal foamer passage 49 extends through the tap body from the rear end of bore 27 down to annular passage 18 between tubes 5 and 16.

Valve 47 is normally biased by spring 48 in metal-to-metal contact against the inner end of sleeve 44, the sleeve and valve being tapered complementary to each other to provide a good valve seat. Sealing ring 50 encircles the forward end of valve 47 and is disposed between the valve and its seat on sleeve 44 to seal off the inside of sleeve 44 when valve 47 is closed. The construction of sealing ring 50 and its groove corresponds to that of sealing ring 39 and its groove and the same advantages are present. O-ring 51 in a groove in bearing 46 seals the outer end of the bore of the sleeve 44 while O-rings 52 encircling sleeve 44 seal off the inner and outer ends of the bore 27.

When valve 47 is open, beer flows into sleeve 44 from diagonal passage 49 and annular passage 18 and is forced through a plurality of radially spaced small holes 53 in sleeve 44 and into bore 27 between O-rings 52, the sleeve being of slightly lesser diameter between the O-rings than the bore. In passing through holes 53 the beer is broken down into foam and the foam then flows from bore 27 down into foamer discharge 25 in spout 23 for discharge from the tap. By threading sleeve 44 into bore 27 at the outer end it is possible to adjust the clearance between the projecting bearing 46 of stem 45 and the operating mechanism.

The operating mechanism comprises a cam member 54 disposed in the counterbore 28 at the front of the tap. A shaft 55 extends through one side of tap 4, through cam 54 and into a boss on the opposite side of the tap body. Set screws 56 hold the shaft and cam 54 together to confine the cam within the counterbore 28. Handle 57 is secured to the outer end of shaft 55 on the outside of the tap to rotate the shaft and cam 54. The central portion of shaft 55 has flat sides to interlock with cam member 54 for rotating the latter.

The lower portion of cam 54 lies within the cam seat 43 of the end of the valve stem 34 of beer valve 33 and the upper flat back portion of the cam rests adjacent bearing 46 on the end of foamer valve stem 45. When handle 57 is pulled outwardly (forwardly) the lower portion of the cam forces the beer valve 33 on stem 34 rearwardly against spring 31 to open the valve and effect discharge of beer from discharge 24. A turned radius on the bottom portion of the cam 54 overrides cam surface 42 on the end of bearing 40 as the cam is rotated to hold the cam in a fixed position and hold valve 33 open without handle 57 being held by the operator. A machined flat 58 on the cam 54 to one side of that portion of the cam overriding cam surface 42 engages the tap body in the bottom of the counterbore to positively limit the rotation of the cam.

A slight touch of the handle 57 by the operator forcing it inwardly snaps the cam off from cam surface 42 and back to a neutral position. This releases beer valve 33 and spring 31 forces the valve outwardly to a closed position.

When the operator pushes handle 57 inwardly (rearwardly) cam 54 is rotated so that the upper portion of the flat back of the cam engages bearing 46 of the foamer valve forcing stem 45 and foamer valve 47 inwardly against spring 48. This opens valve 47 and beer flows through holes 53 in sleeve 44 to be broken into foam and discharged from spout 23 through foamer discharge 25. A stop 59 on the upper portion of the cam engages sleeve 44 to limit the rotation of the cam. When the operator releases the handle, spring 48 forces bearing 46 outwardly against the cam which then assumes its neutral position.

The counterbore 28 is closed at the outer end by plate 60 which snaps over the outer end of the tap.

To obtain beer, cam 54 is rotated, as described, to open beer valve 33. Beer then flows from coils 13, through passage 14, chamber 15, inner tube 16, sleeve 17, and bore 26, to be discharged from the spout 23 through beer discharge 24. The beer in its flow through the control tank flows through an extended length of tubing located in the bottom of the tank where the beer is most solid to prevent wildness therein. The beer is forced from the barrel or source of beer, not shown, to the control tank under a predetermined pressure to retain carbonization therein and the beer is maintained under pressure in its flow through the control tank, coils 13 and the tap to hold the carbonization of the beer. The flow of the beer after leaving the coils 13 is through passages of gradually increasing cross-section. Thus the bore of sleeve 17 is of greater diameter than tube 16 and discharge passage 24 is of greater cross-sectional area than sleeve 17 or bore 26 of the tap body.

Also best results are obtained if a definite relationship is maintained between the diameter of the discharge passage 24 and of coils 13. Thus, tests have indicated that the diameter of the discharge passage 24 should be maintained at from 2.2 to 2.8 times greater than the diameter of the coils 13 irrespective of the changes made in the length of coils 13 or in the length and size of the passages between the coils and passage 24 of the tap spout.

When foam is desired, cam 54 is rotated, as described, to open foamer valve 47 and beer flows off from the top of the control tank through trap 22, passage 21 in head 2, annular passage 18, foamer passage 49, and sleeve 44 from whence it flows through holes 53 to be broken into foam into bore 27 for discharge as foam through foamer discharge 25 in spout 23.

The air vent 30 described, in operation is open at the top and vent cap 61 in normal operation of the tap is open. However, when the tap is being cleaned by steam or the like then cap 61 is threaded tightly into the tap body to close vent 30 and guard against any escape of cleaning fluid during the cleaning operations.

Fig. 9 illustrates a control tank in which the beer inlet is at the top. As in the tank shown in Fig. 1, tube 12 is inset within lower head 3 and slants to a location adjacent the wall of the tank.

Beer enters tube 12 through a small tube 62 which extends within tube 12 from the top for a substantial distance. Tube 62 is secured within head 2 in a passage which opens into the horizontal passage 63 in the head 2 of the control tank. Passage 63 is suitably connected to the source of the beer. Here again, in this construction, the beer flows through an extended course comprising tube 62, tube 12 and the control tank from which it is discharged through the coils 13 of substantial length, as described, with respect to the showing in Fig. 1. This flow of the beer before reaching the tap prevents wildness therein.

By introducing the beer to the tap through a slanting tube in a small tank and coils a solid smooth flow of beer is obtained and the full carbonization of the beer is retained. This solid flow of beer and volume control thereof is accomplished by the slanting tube 12 and by the gradual change in cross-sectional areas through which the beer flows, starting at the inlet of the tank and ending at the beer outlet.

The foamer unit operates to bleed off any gas or air that may accumulate at the top of the tank to additionally aid in the delivery of a smooth solid flow of beer and insure that the tank is always completely filled with liquid beer.

The system is adaptable to conventional types of cooling systems for beer.

In addition, beer and foam can be drawn at will with the foam drawn to a head which will operate to seal off in the glass or other container receiving the drawn beer the carbonization and flavor brewed into it.

The tap is readily assembled and disassembled for cleaning. Beer also will not be trapped in the tap after drawing is completed due to the air vent described.

Various embodiments of the invention may be employed within the scope of the accompanying claims.

I claim:

1. A dispensing system for beer in desired amounts of beer and foam, which comprises a control tank having a tube secured longitudinally therein for receipt of beer and slanted close to the wall of the tank to discharge the beer into the tank in a single path of flow and said tank confining a predetermined quantity of beer under pressure, a tubular conduit disposed in a coil in the tank to receive solid beer from the bottom of said tank with the inlet of the conduit at the bottom of the tank and the outlet of the conduit through the top of the tank, and said conduit being of a length sufficient to quiesce the beer flowing therein, a second outlet in the upper part of the tank for the contained beer, a tap connected to the outlet for beer from said conduit and the outlet for the beer from the top of the tank and having valve means selectively controlling the flow of beer from the tank through the respective outlets in the quantities desired, and means in said tap disposed to disintegrate the beer flowing from the top of the tank after it has passed said valve means to create foam for dispensing the same in the quantity desired on top of the carbonized beer drawn from the bottom of the tank.

2. A beer dispensing system comprising a control tank through which beer flows under pressure from a source connected to said tank, a tap having a horizontal passage therethrough having its rear end connected to the bottom of said tank for flow of beer therethrough and a second horizontal passage through the tap having its rear end connected to the top of said tank for flow of beer therethrough, means in said tap to form foam of the beer flowing in said second passage, a valve movable longitudinally within each passage and biased forwardly to normally close said passages against flow of beer from said tap, each said valve having a stem extending through the forward end of the corresponding passage to actuate the same and sealed in the passage at all times to prevent escape of beer through the forward end of the passage, separate discharge passages for beer and for foam from said tap and connected to the corresponding passages between the corresponding valve and the valve stem seal in the passage, a rotatable member pivoted in the forward end of the tap transverse to said valves, means disposed to rotate said member in one direction to engage the stem and move the valve of said first passage open for flow of beer from the tank and out through said beer discharge passage and to rotate said member in the opposite direction to engage the stem and move the other of said valves open for flow of foam from said foam discharge passage as the first valve is biased to normally closed position, and a central groove in the first named passage at the merger with the discharge passage for the beer to smoothen the flow of beer into the discharge passage.

3. A beer dispensing system comprising a control tank through which beer flows under pressure from a source connected to said tank, a tap having a horizontal passage therethrough having its rear end connected to the bottom of said tank for flow of beer therethrough and a second horizontal passage in the tap having its rear end connected to the top of said tank for flow of beer therethrough, means in said tap to form foam of the beer flowing in the second passage, a valve movable longitudinally within each passage and biased forwardly to normally close said passages against flow of beer and foam from said tap, each said valve having a stem extending through the forward end of the corresponding passage to actuate the same and sealed in the passage at all times to prevent escape of beer through the forward end of the passage, separate discharge passages connected to the corresponding passages between the corresponding valve and the valve stem seal in the passage for flow of beer and foam from said tap, a cam pivoted in the forward end of the tap transverse to said valves, means disposed to rotate said cam in one direction to engage the stem and move the valve of said first passage open for flow of beer from the tank through said beer discharge passage and to rotate said member in the opposite direction to engage the stem and move the second of said valves open for flow of foam from said foam discharge passage as the first valve is biased to normally closed position, and a cam surface on the outer end of the valve stem of said first named passage over which the cam rides to mechanically lock the first valve open for discharge of beer.

4. In a tap connected to a source of beer and having a downwardly extending discharge passage, a tap body having a chamber communicating with said source of beer and opening into said discharge passage, a valve disposed in said chamber to control the flow of fluid therethrough and seated within said chamber against a wall of the chamber, a spring biasing said valve against the seat thereof to normally hold the valve closed, a valve stem for said valve extending within said chamber and projecting therefrom at the front of the tap, an air vent extending through said tap body to said chamber between the discharge passage and the forward end of the valve stem, a gasket around the valve stem to close said air vent to the discharge passage when the valve is open and to open the air vent to the discharge passage when the valve is closed to free beer trapped in the chamber and discharge passage, said gasket serving to seal the stem in the body of said tap to prevent flow of fluid from the front of the tap body, and means engaging the outer end of the valve stem to selectively open and close said valve.

5. In a tap connected to a source of beer under pressure and having a downwardly extending discharge passage, a chamber in the tap communicating with said source of beer and opening into said discharge passage, a sleeve threaded into the outer end of said chamber at the front of said tap, a valve disposed in said chamber to control the flow of beer and gas therethrough and seated against the inner end of said sleeve, a spring biasing said valve against the sleeve to normally hold the valve closed, a valve stem for said valve extending within said chamber and projecting therefrom at the front of the tap, a gasket around said stem preventing flow of fluid from the front opening of said chamber, said sleeve having a plurality of fine holes therethrough forwardly of said valve, and a cam pivoted at the front of the tap and adapted to engage the projecting end of the valve stem and to be rotated to move the valve against said spring and open the valve for flow of beer into said sleeve and through the fine holes therein to disintegrate the same into foam for discharge through the discharge passage.

6. In a tap of the class described, a tap body having a horizontal cylindrical bore therethrough from front to rear, the rear end of said bore being larger than the front end, a frusto-conical valve seat formed as a shoulder facing rearwardly between the rear end and the front end portions of said bore, a fluid discharge passage extending downwardly from the forward end portion of said bore between said valve seat and the front of the tap body, a valve disposed to move and means at the front of the tap body to engage and actuate said valve stem.

7. In a tap connected to a source of beer under pressure and having a downwardly extending discharge passage, a chamber in the tap communicating with said source of beer and opening into said discharge passage, a sleeve threaded into the outer end of said chamber at the front of said tap, a valve disposed in said chamber to control the flow of beer and gas therethrough and seated against the inner end of said sleeve, a spring biasing said valve against the sleeve to normally hold the valve closed, a valve stem for said valve extending axially of said sleeve and projecting through the forward end thereof, the forward end of said valve stem being enlarged to fit the bore of said sleeve, a gasket encircling the enlarged forward end of said valve stem to seal the same in said sleeve and prevent escape of fluid through the front end of said sleeve, said sleeve being recessed radially on the outer circumference thereof to provide a foam chamber between it and the body of the tap, a discharge passage in said tap in communication with said foam chamber to discharge foam therefrom, a plurality of minute ports through said sleeve for admitting fluid passing said valve into said foam chamber, and means at the front of the tap to engage the valve stem and actuate the same against said spring.

References Cited in the file of this patent

UNITED STATES PATENTS

| Number | Name | Date |
|---|---|---|
| Re. 6,394 | Bickel | Apr. 20, 1875 |
| 491,272 | Schier | Feb. 7, 1893 |
| 1,519,231 | Benjamin | Dec. 16, 1924 |
| 1,686,849 | Frauenheim | Oct. 9, 1928 |
| 1,743,738 | Travis | Jan. 14, 1930 |
| 1,774,690 | Willoughby | Sept. 2, 1930 |
| 2,081,000 | Cornelius | May 18, 1937 |
| 2,165,605 | Baker | July 11, 1939 |
| 2,208,611 | Taylor | July 23, 1940 |
| 2,327,444 | Nigbor | Aug. 24, 1943 |
| 2,331,872 | Testori | Oct. 19, 1943 |
| 2,371,028 | Christ | Mar. 6, 1945 |

FOREIGN PATENTS

| Number | Country | Date |
|---|---|---|
| 305,050 | Italy | Jan. 25, 1933 |